(12) United States Patent
Snow

(10) Patent No.: US 12,441,469 B2
(45) Date of Patent: Oct. 14, 2025

(54) SEAPLANE ELECTRIC THRUSTER DRIVE SYSTEM FOR LOWSPEED MANEUVERING

(71) Applicant: Terry Robert Snow, Oak Harbor, WA (US)

(72) Inventor: Terry Robert Snow, Oak Harbor, WA (US)

(*) Notice: Subject to any disclaimer, the term of this patent is extended or adjusted under 35 U.S.C. 154(b) by 237 days.

(21) Appl. No.: 18/110,480

(22) Filed: Feb. 16, 2023

(65) Prior Publication Data
US 2024/0109655 A1    Apr. 4, 2024

Related U.S. Application Data

(60) Provisional application No. 63/310,546, filed on Feb. 15, 2022.

(51) Int. Cl.
*B64C 35/00*    (2006.01)
*B60L 50/60*    (2019.01)
(Continued)

(52) U.S. Cl.
CPC ............ *B64C 35/005* (2013.01); *B60L 50/60* (2019.02); *B60L 58/10* (2019.02); *B64C 25/50* (2013.01); *B64C 25/54* (2013.01); *B60L 2200/10* (2013.01)

(58) Field of Classification Search
CPC ....... B64C 35/005; B64C 25/50; B64C 25/54; B60L 50/60; B60L 58/10; B60L 2200/10; B63C 35/005
See application file for complete search history.

(56) References Cited

U.S. PATENT DOCUMENTS

| 1,906,712 | A | * | 5/1933 | Norton | ..................... | B64C 35/00 |
| | | | | | | 244/235 |
| 10,227,120 | B2 | * | 3/2019 | Ajello | ..................... | B63H 25/02 |

(Continued)

OTHER PUBLICATIONS

Excerpt from webpage "https://www.vickersaircraft.com/whats-new/" of Nov. 2017, 1 Page.

*Primary Examiner* — Stephen P Avila
(74) *Attorney, Agent, or Firm* — LUCAS & MERCANTI, LLP

(57) ABSTRACT

The present invention comprises a system which includes a novel quick release thruster mount system using one or more removable elements allowing the thrusters to be removed quickly. The present invention also comprises a novel "float compartment centric" design where no wiring to the cockpit is necessary. Redundant power units are self-contained and protected. The novel design incorporates thrust force over the surface of the water rudders improving directional control. The rudder anti lift device ALPB allows the rudders to remain in the water while reverse or braking thrust is applied. Control and monitoring are done wirelessly from the safety of the cockpit reducing hazard while maneuvering to avoid prop strike hazards to pilot, persons or objects. The system offers the ability to maintain positive directional control while taxing downwind resisting the inherent weathervane forces, braking, and turning maneuvers unachievable with current methods. The system differs from any prior art due to the aft location of drive components, method for deployment, and the fact that the drive system does not mount directly to the float itself but rather the water rudders. These forces are marginal in comparison to what is needed when one takes into consideration the Moment and Arm location of the force and the smaller lightweight thrusters do more work with less effort.

19 Claims, 17 Drawing Sheets

(51) Int. Cl.
*B60L 58/10* (2019.01)
*B64C 25/50* (2006.01)
*B64C 25/54* (2006.01)

(56) References Cited

U.S. PATENT DOCUMENTS 10,843,778 B1* 11/2020 Walkowiak ............ B63H 25/46
11,511,832 B2 11/2022 They
2010/0032522 A1* 2/2010 Zadini .................... B63H 25/46
244/105

\* cited by examiner

Electrical flow Diagram

SEAPLANE ELECTRIC THRUSTER DRIVE SYSTEM FOR LOWSPEED MANEUVERING

CROSS-REFERENCE TO RELATED APPLICATION

This application claims the benefit of U.S. Provisional Application No. 63/310,546, filed Feb. 15, 2022, the entire content of which is incorporated herein by reference.

1. FIELD OF THE INVENTION

The present field of the invention relates to novel methods to propel a seaplane by means of electric thrusters. More particularly, the invention relates to a system of components that when used in a specific manner have proven to allow full maneuverability of an aircraft vessel while on water. The system also allows quick release mechanisms for the twin thrusters and easy installation of the wireless Power Distribution Unit/units.

2. BRIEF DESCRIPTION OF PRIOR ART AND BACKGROUND OF THE INVENTION

Seaplanes when in water are traditionally maneuvered using water rudders and the forward motion provided by the propeller, wind sailing techniques and lastly by paddle. Currently there are no adaptations to provide low speed positive maneuverability while operating as a marine vessel close to docks, other aircraft, obstructions or simply to get to safety. Additional force must be applied to overcome even a moderate amount of wind.

Therefore a need exists for a novel low speed, light weight, propulsion system capable of maneuvering the aircraft with the engine off. There is also a need for the system to be able to be deployed and operated from within the aircraft cockpit to move the aircraft forward, reverse, turns, side slips, slow to a stop and reverse.

Often the Pilot is the only person qualified to handle the aircraft with docking, tying up, and moving the aircraft into position. While the power plant is turned off the vessel (as defined by the USCG while an aircraft is on the waterway), is subject to Newton's first law of motion, wind, tidal flow, and currents. These forces can make even the most experienced Seaplane Pilot unable to maneuver to a dock without damaging another seaplane or crashing uncontrollably into an object. There are some aircraft that are powered with a reversible prop (Beta) which are sometimes used as a brake or to back an aircraft using reverse prop thrust. This can be dangerous and can lead to injury or death but often is the only way for a single operator to maneuver a vessel slowly while remaining at the controls of the aircraft.

While there may be some solutions that have been applied to experimental aircraft such as an electric trolling motor attached to a spreader bar, clamped to the aft deck, or the like they are limited in many aspects due to weight, size, power, drag coefficient while airborne, and require hands on control while in water. Some other solutions have attempted to deploy motors from the float hull itself by means of a retractable pod, using mechanical worm drives. This method can cause more harm to the aircraft than good if left in the deployed position, and more importantly the amount of thrust necessary increases payload and demands on the hull structure.

Insurance claims due to accidents where the aircraft is drifting are plentiful and the need for additional low speed directional maneuverability still exists. Personal watercraft, individuals on paddle boards, a child or pet on a beach running up to greet the aircraft, are all difficult to see from the pilot's point of view. Having an accepted method to control the vessel more effectively without the propeller moving will reduce the chances for personal injury or death and avoid collisions.

Finally, there is a need for the system to be rapidly removed for service and or stowage. Being attached to an aircraft it is necessary the components are aero dynamic and are mounted in a location so as to reduce drag. The solution should be light weight, use low power, be self-contained, and work efficiently to maneuver the seaplane with the appropriate force from the most efficient location for the pilot, the cockpit.

3. BRIEF SUMMARY OF THE INVENTION

The present solution includes a quick release mounting system for a set of underwater thrusters mounted to the seaplane water rudders. The mounting elements are configured with at least one male or female quick release locking element and in some embodiments which include mounts the water rudder hardware of most float planes and then the thruster brackets themselves.

Another objective is to incorporate the use of an RF transmitter to control the thrusters by way of an RF receiver, transmitter and associated power supplies which are mounted in the float compartment.

Yet another objective is for the water rudders to be able to move freely and be retracted for flight, while the thrusters are mounted.

One advantage is the weight and balance of where the Power Distribution Units and thrusters are installed. This location allows for the best use of force provided to push the tail of the aircraft versus the force applied from a more forward location.

Additional objectives were to incorporate redundancy into the system should one component fail, they would fail safe acting independent of one another.

Another distinct advantage is the ability to provide a braking motion to the vessel from within the aircraft allowing the aircraft to avoid collision and to also provide reverse motion.

Still another objective is to keep the Power units flush to the float deck to abate tripping hazards and yet make them easily removed for service and stowage.

4. BRIEF DESCRIPTION OF THE DRAWINGS

Some embodiments of the present invention are illustrated as an example and are not limited by the FIG.s of the accompanying drawings, in which like references may indicate similar elements and in which.

Figure 14:
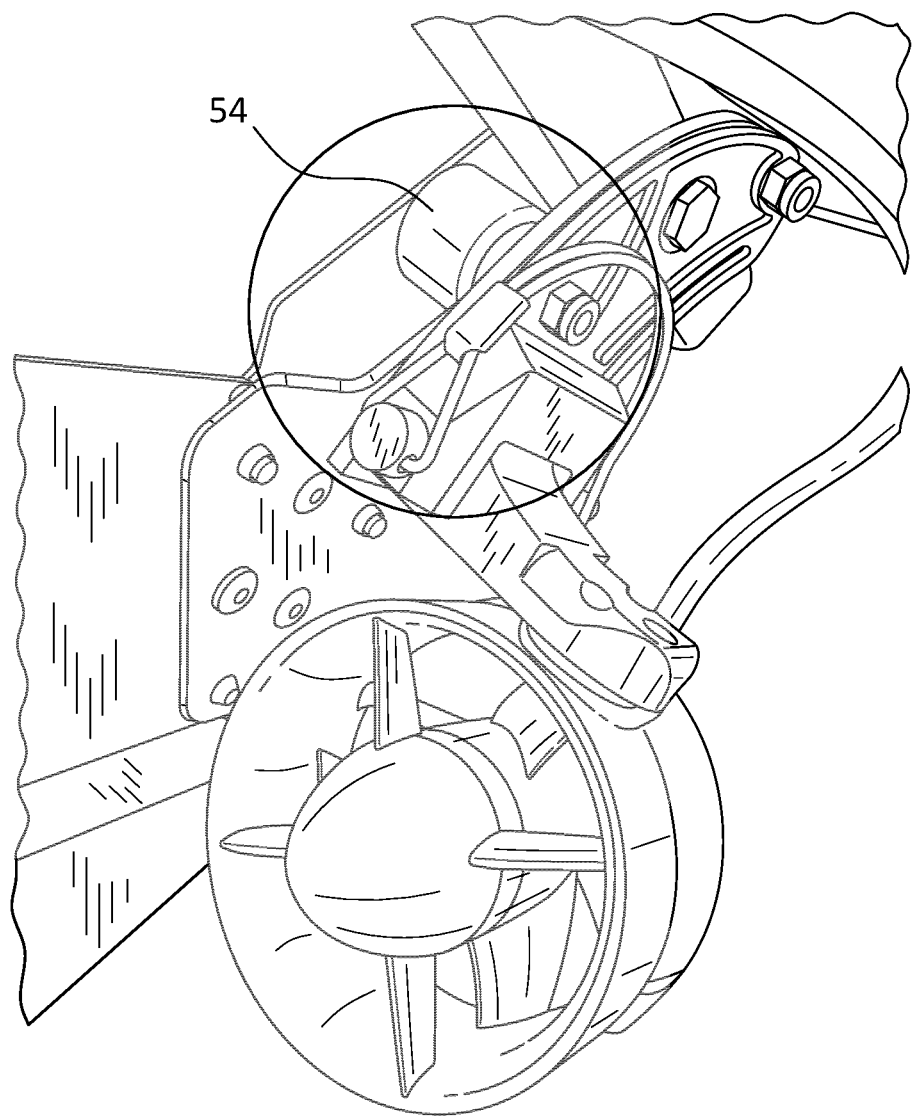

FIG. 14 Top view of the Anti-Lift Polyurethane Bushing in the Up (stowed) position.

Figure 15:
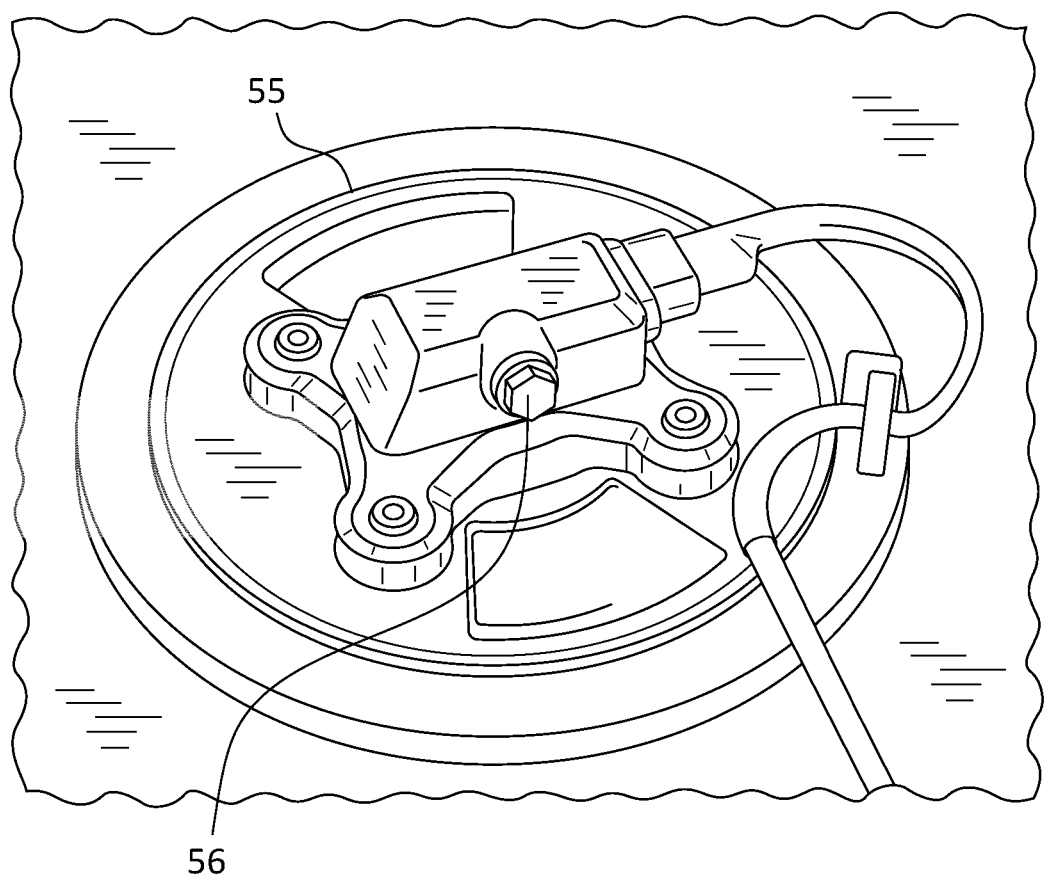

FIG. 15 Top view of the Power Distribution Unit with power signal wire and Switch.

Figure 16:
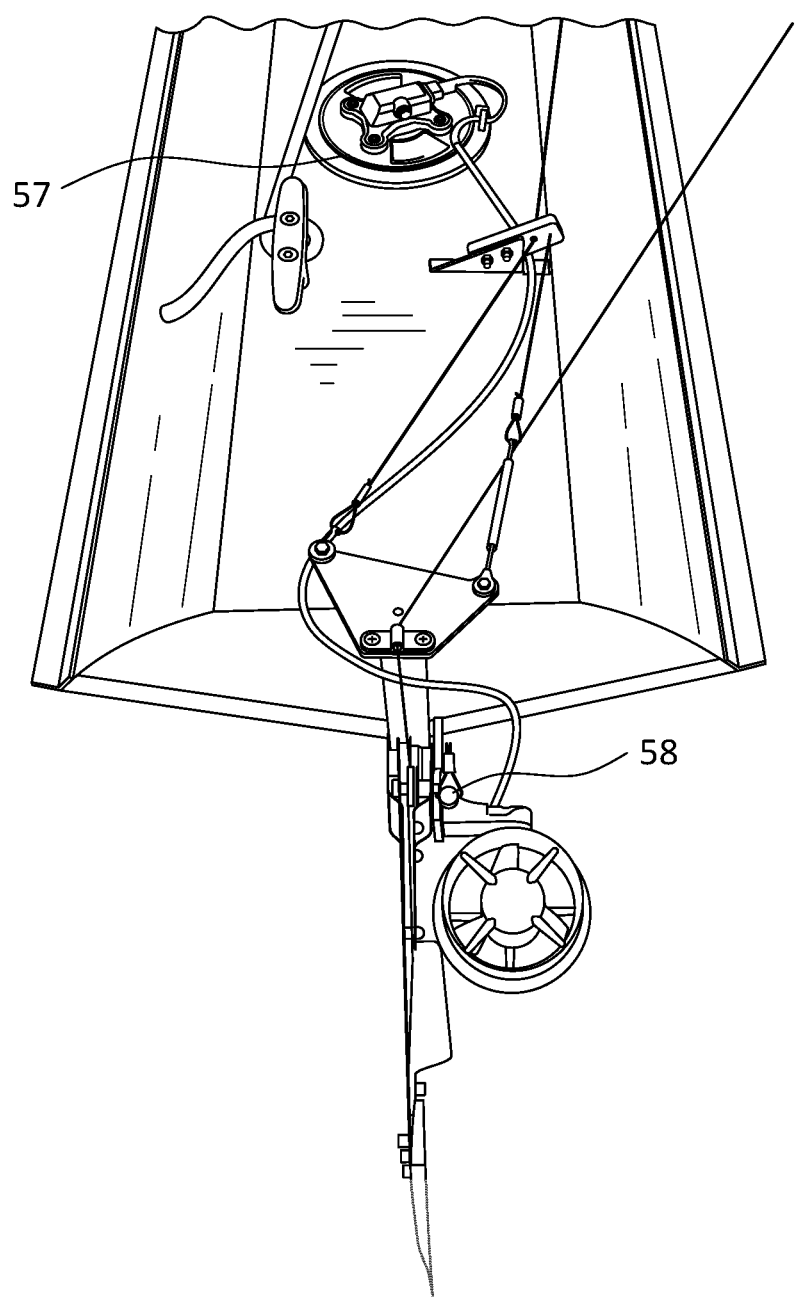

FIG. 16 Top rear view of an installed drive and power unit to the left float

Figure 17:
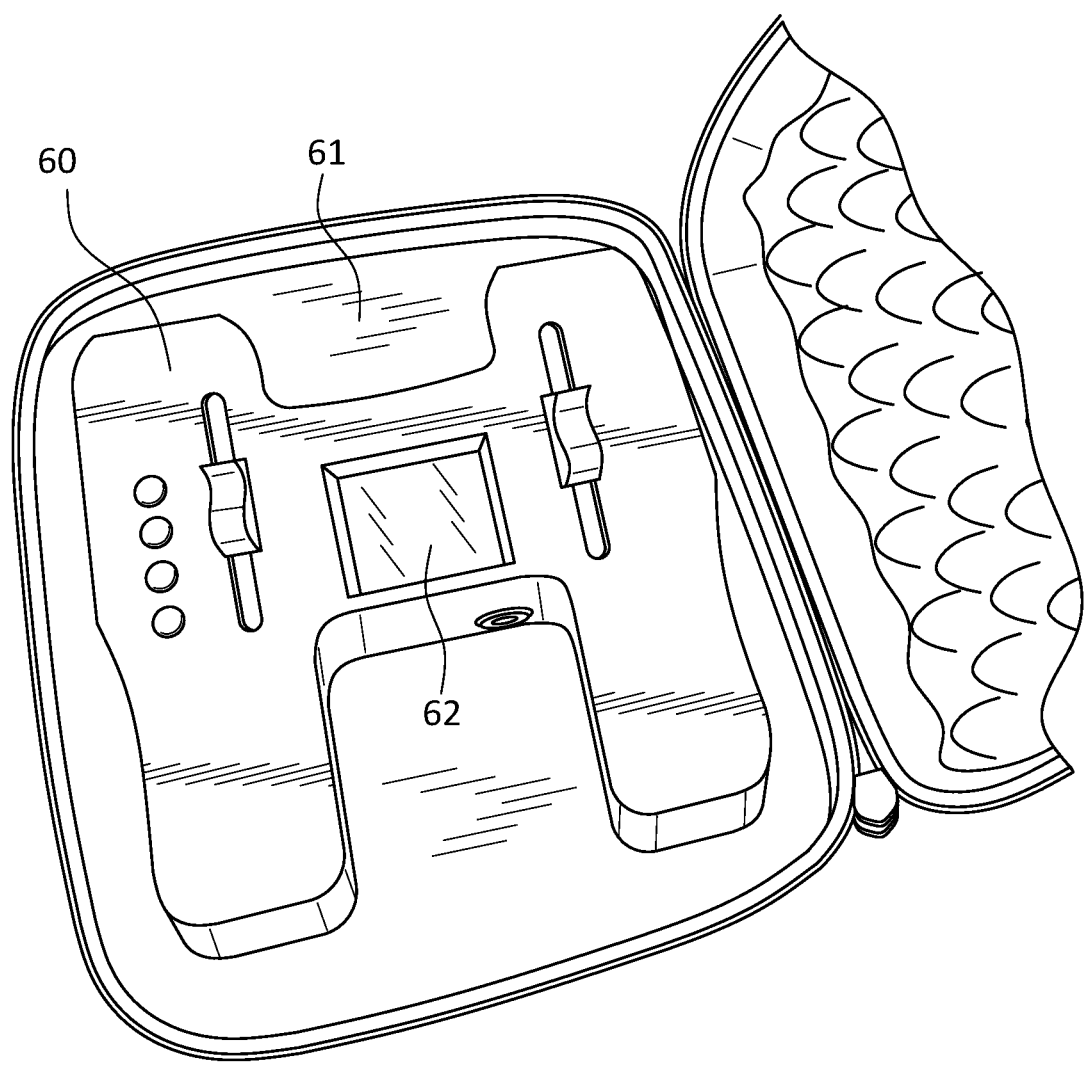

FIG. 17 Top view of the Control unit with wireless status monitor

5. REFERENCE NUMERALS IN DRAWINGS

51 Quick Release Pin for thruster removal
25 ALPB bushing and nylon roller component for water rudder down control.
57 Power Distribution Unit for thruster drive control
52 Male element locking tab for B thruster bracket and 53 Female locking element for A brackets respects.
Wireless controller unit with monitoring 61& 60

7. DETAILED DESCRIPTION OF THE INVENTION

The terminology used herein is for the purpose of describing embodiments only and is not intended to be limiting of the invention. As used herein, the term "and/or" includes all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having 1 ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that several techniques and steps are disclosed. Each of these has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New modular quick release thruster mounting systems are discussed herein. In the following description, for purposes of explanation, numerous specific details are set forth to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the FIG.s or description below.

The present invention will now be described by referencing the appended FIG.s representing preferred embodiments. (FIG.) 1 depicts an example of a type of mounting bracket used to attach a thruster to a water rudder with various embodiments of the present invention. The mounting brackets will have 2 pieces shown in FIG. 1 and FIG. 2 and in preferred embodiments can be extended in length. In other embodiments there may be different shapes thicknesses and made from diverse types of materials.

Figure 2:
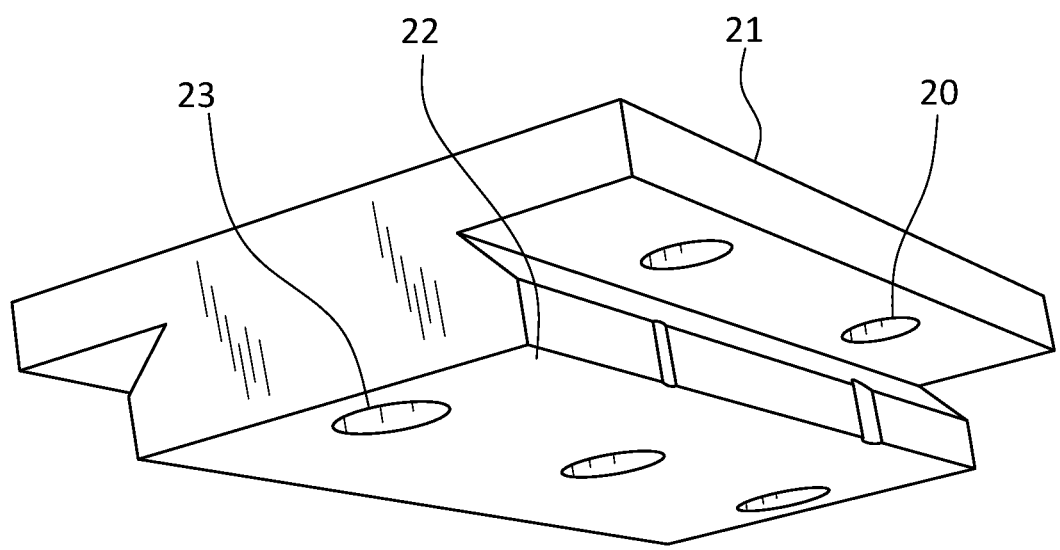
FIG. 2 Shows a substantially front perspective view of one example of the male quick release thruster mounting plate according to various embodiments described herein.

The Mounting bracket 4 may be configured with one or more attachment elements such as a quick release female element 6 configured to engage with an opposing quick release attachment element such as a male element 21 (FIG. 2). The male elements 21 and female elements 4 can temporarily secure to each other by a pressure fit or by a cam lock style connection that engages or disengages upon a clockwise or counterclockwise twisting motion. In this example, the Mounting bracket 4 is configured with one male element 21 on the outside facing surface and one female element 6 on the second mounting plate (FIG. 3) 9.

Quick release male elements 22 (sometimes just called "male elements") and quick release female elements 6 (sometimes just called "female elements") may be made from aluminum, polycarbonate, glass filled plastic, rubber, or any other suitable type of material. Male elements 22 preferably have a locking tab. In some embodiments the abovementioned components of male element 21 may be molded from as a single piece of material such as plastic or rubber. Female element 6 is configured to receive and temporarily secure male element 22

Mounting plate section 4 may be made from aluminum, carbon fiber, steel, fiberglass, or any other suitable material that is preferably lightweight yet strong enough to support varying degrees of weight. The mounting plate 4 is sized to fit various water rudder hardware via the mounting bolts in a clamping manner. In some embodiments, the mounting plate 4 has two holes which mount to the rudder attach points with a diameter of about ¼ inch.

Figure 1:
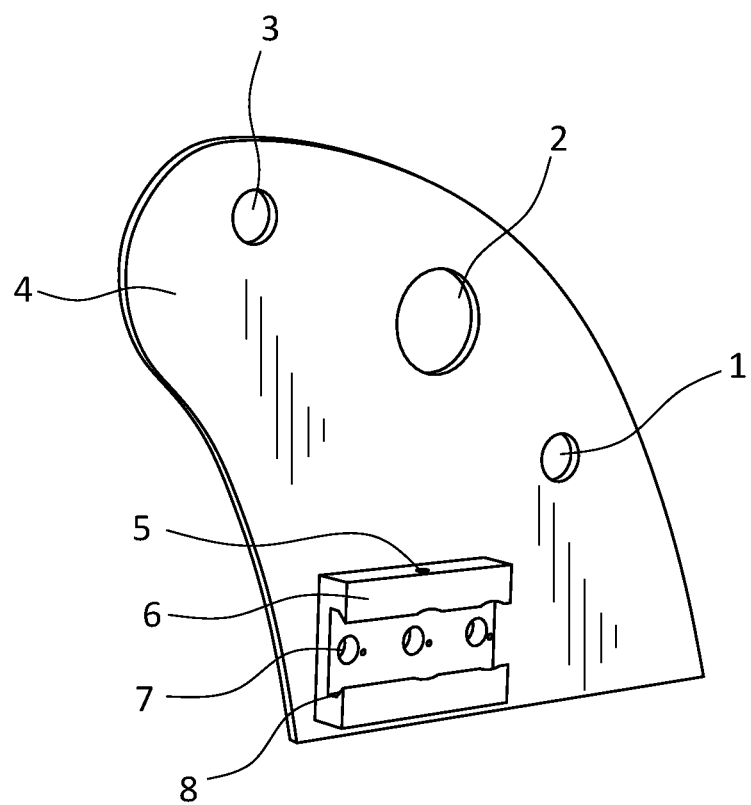
FIG. 1 Depicts a side perspective view of one example of a thruster mounting plate with a female quick release bracket according to various embodiments of the present invention.
Figure 6:
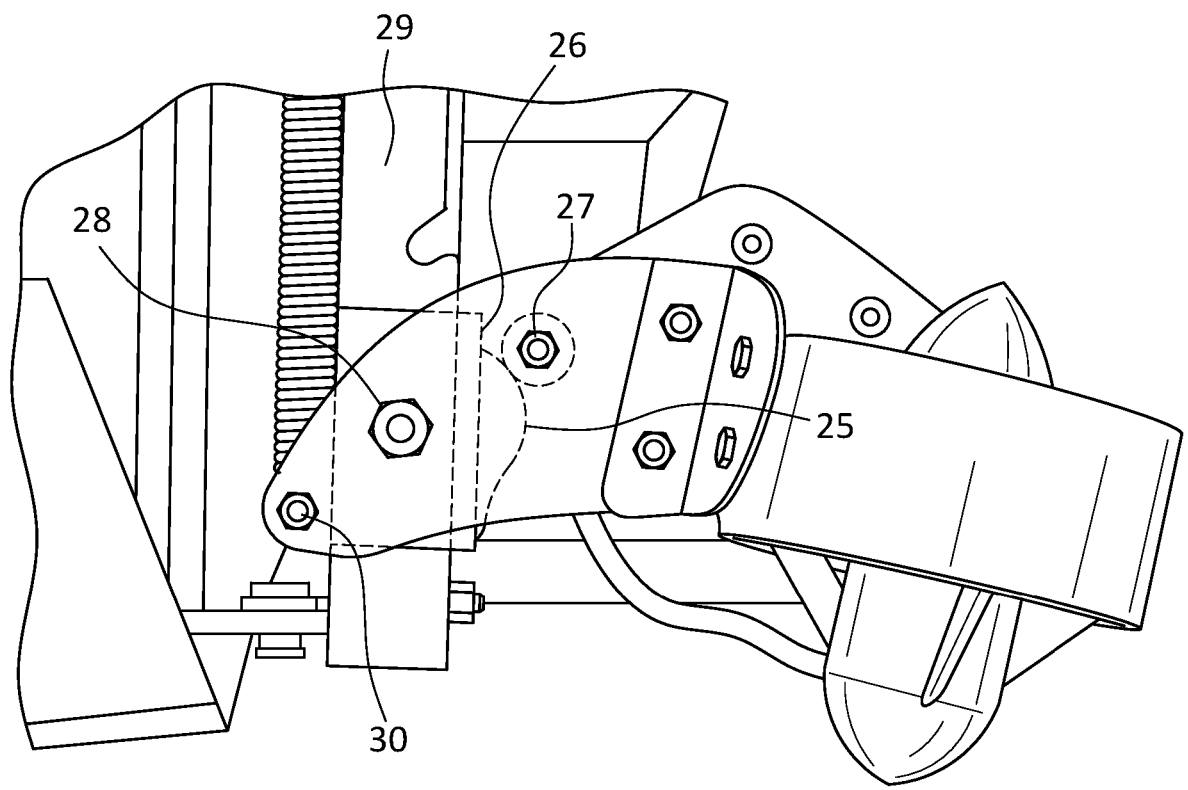
FIG. 6 Illustrates an example of a substantially side view of the thruster mounted and a depiction of the ALPB bracket according to various embodiments described.

In other embodiments, there is a larger hole 2 (FIG. 1) which allows for the pivot bolt head 28 FIG. 6 to pass through the hole 1 FIG. 1 in the bracket unobstructed and may be between one half of an inch to ¾ inches diameter. Referring to (FIG. 2) 22 in some embodiments, a water rudder pivot bolt or nut may be configured to pass through the mounting plate allowing it to sit flus against the rudder mounting hardware. The bracket remains fitted tight with the appropriate hardware.

In other embodiments, the bracket length may be extended to allow for clearance or if more reach is necessary for depth in the water. Therefore, the position of the female element 4 is not set and may be repositioned to fit any number of float types.

Referring to (FIG.). 2 Shows the back side of the male bracket 22 is flat to accept the thruster surface and hardware according to various embodiments of the present invention. In this example, the surface may be made from plastic, metal, or any other suitable material.

Figure 3:
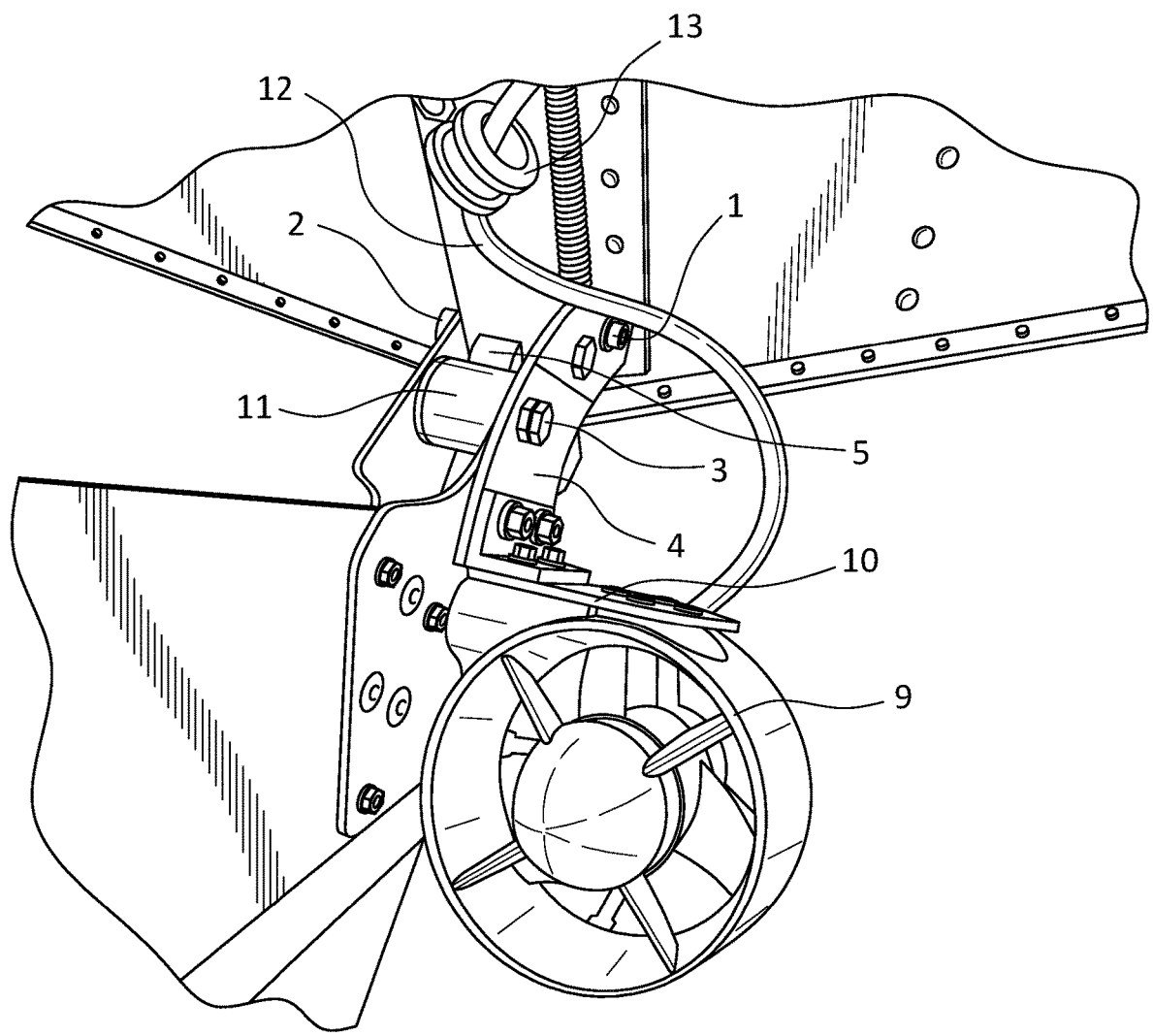
FIG. 3 shows an example of a perspective front view of the complete installed thruster with beta version of the mount bracket and the Anti-Lift Poly Bushing (ALPB) according to various embodiments described herein.
Figure 4:
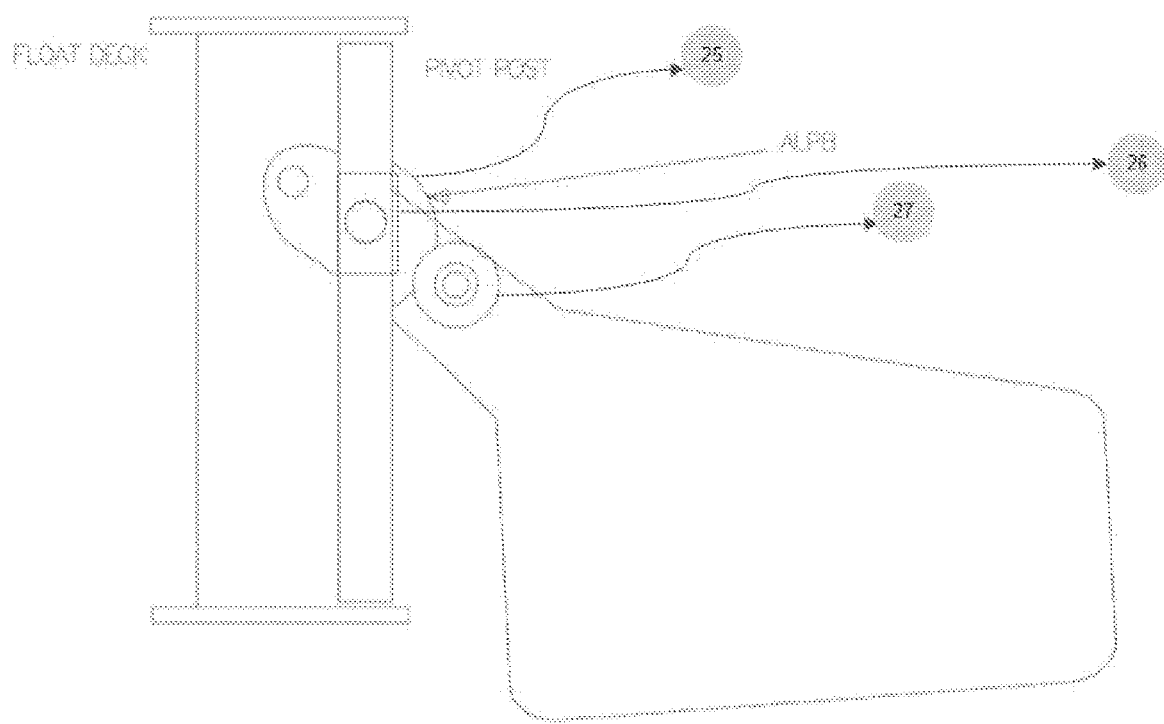
FIG. 4 Depicts an example of a side view of the water rudder lowered in the taxiing position with the ALPB bushing holding it down according to various embodiments described herein.

FIG. 4 Illustrates an example of the Anti-Lift Polyurethane Bushing which functions as an over center soft locking mechanism to 5 (FIG. 3) a Nylon roller 11 (FIG. 3), both of which are placed in between the water rudder attach plates, and in the case shown the tiller post, and may be referred to as a pivot post. In this example, the anti-lift bushing comprises half of a polyurethane bushing to make the center apex of the motion for 11 to pass over with some manual force but not enough to allow the rudder to lift while the thrusters are in forward at full thrust. This is a center over cam movement and allows for a predetermined amount of force to hold the water rudder in the down position as in the case of an outboard motor or the like which incorporate a locking mechanism to prevent this upward action without the intent.

The power input cord for the thruster 12 is strain relieved with a saddle trap 13 and fixed to the water rudder pivot Post.

The Thruster shown in (FIG. 3) 9 is a waterproof, sealed brushless DC (BLDC) motor which has its own threaded mounting hardware. The holes in the male element FIG. 2 20 can be ordered to fit the correct thruster.

FIG. 3 Depicts the bolt 3 used as the outboard attachment bolt which is used as an axle for the ALPB Nylon roller 11. (FIG. 4, FIG. 5, and FIG. 6) this nylon roller is shown as 27 according to various embodiments of the present invention 27 may be made from glass filled nylon, plastic, metal, or other similar material.

Figure 5:
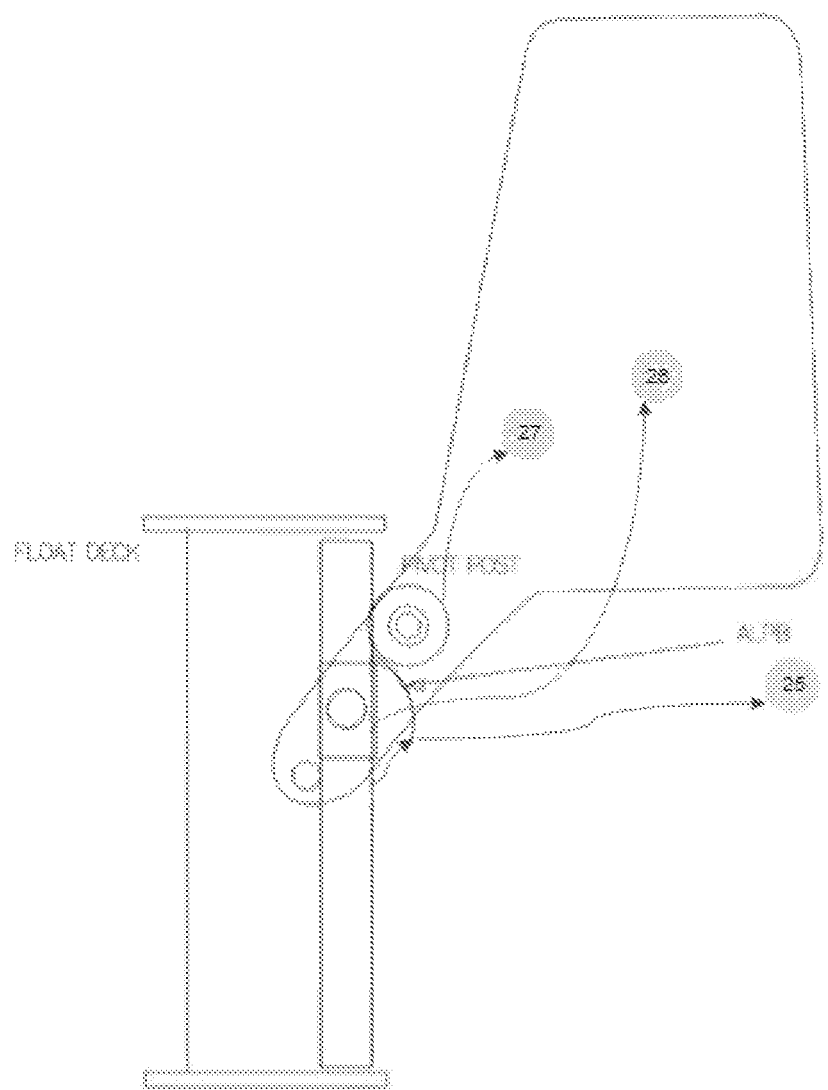
FIG. 5 Illustrates a side view of an example of the water rudder raised in the stowed position for takeoff and flight with the ALPB below according to various embodiments described herein.

FIG. 4 U-shaped bracket fits around the Pivot post 26 FIG. 5 (FIG. 6) 31. This plate 26 may be used to connect the Bushing 25 to the Pivot post 31 by using the already provided Pivot bolt and normally loose fitment of the water rudder mounts to the pivot post. In preferred embodiments, two thin nylon thrust 28 rollers between the rudder bracket and the pivot post 29 also referred to as the Tiller post, to improve the smoothness of the "over center" cam locking/movement.

FIG. 5 Depicts the Water rudder in the up and stowed for flight position in the current invention. 25 the Poly Bushing, is fastened to 26 bracket and mounts to the vertical pivot post 29 held in place by means of 28.

An example of the tension spring and through bolt 30 used to assist the water rudder to remain in the down position is illustrated in FIG. 6.

FIG. 6 depicts a side view of the thruster mounted to the water rudder and in the up position. The sketched lines 25, 26, 28 show the placement of the bracket and poly bushing as well as the nylon bushings 28 for reduced wear on the water rudder arms. The shape of the bushing is cut away to hold the Nylon bushing 26 tight while in the lowered position.

Figure 7:
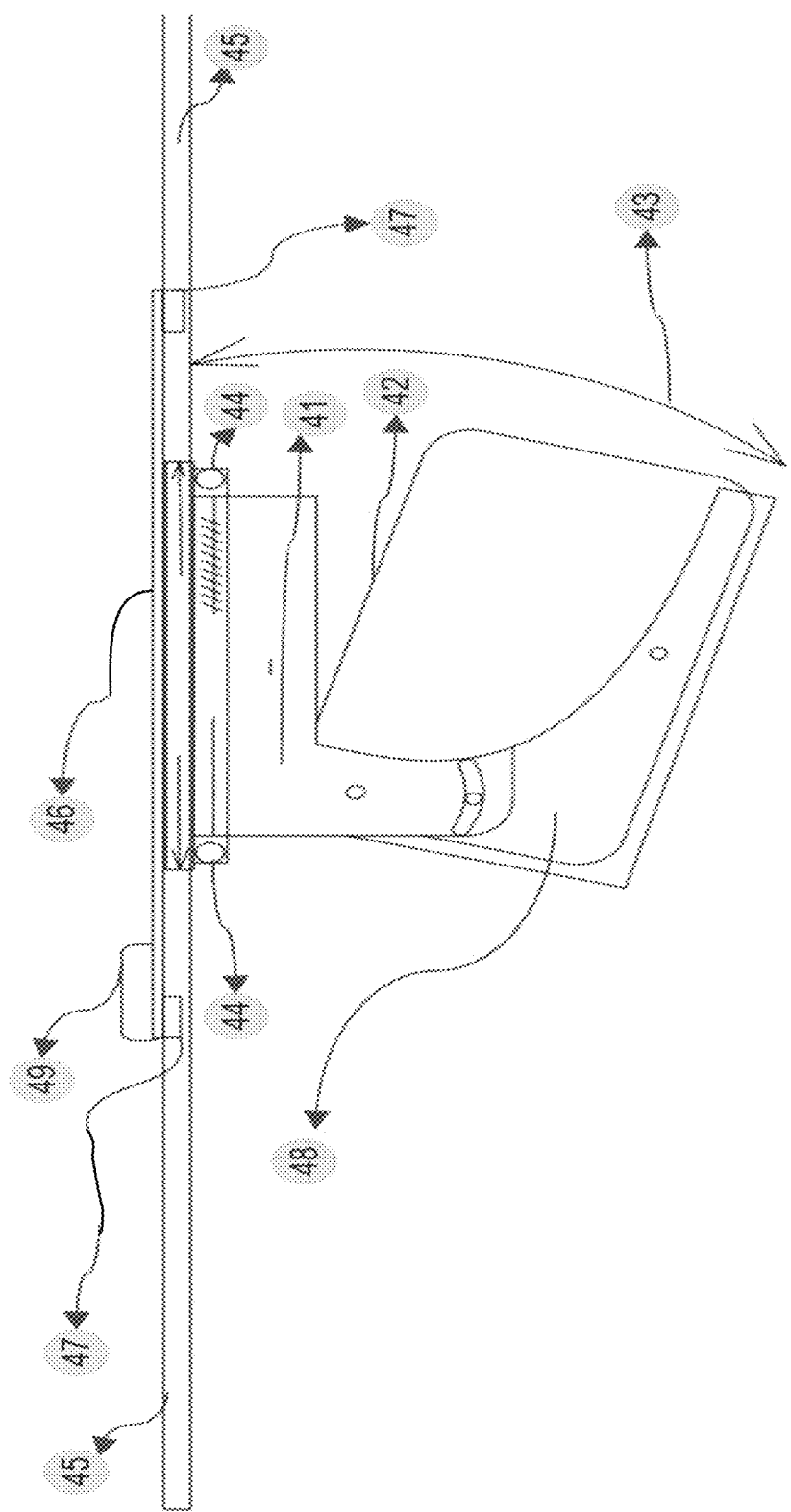
FIG. 7 Illustrates an example of the Power Distribution unit and the locations for each component according to various embodiments described herein.

FIG. 7 Side view of the power distribution system according to various embodiments of the present invention. The Power Distribution unit comprises a carbon fiber deck plate and solar panel 46 attached to the top of the Power Distribution unit 44. In the Power Distribution unit is the electronic speed control and various components for wireless communication See FIG. 9 Flow chart. One Wire is used to transmit from the ESC to the thruster input and features a quick disconnect.

FIG. 7 Also depicts an example of the Power Distribution unit connecting to the Battery 42 using a custom-made enclosure 44, both are configured to fit through any standard diameter hatch located on many standard float decks 45. In the preferred embodiments, Battery is angled 43 to fit with the deck plate 46 ld. flat and to clear the float top and bottom 50 with no contact. The seal is made when the cam lock tightens to secure the entire Power Distribution unit from coming out unintentionally.

Figure 8:
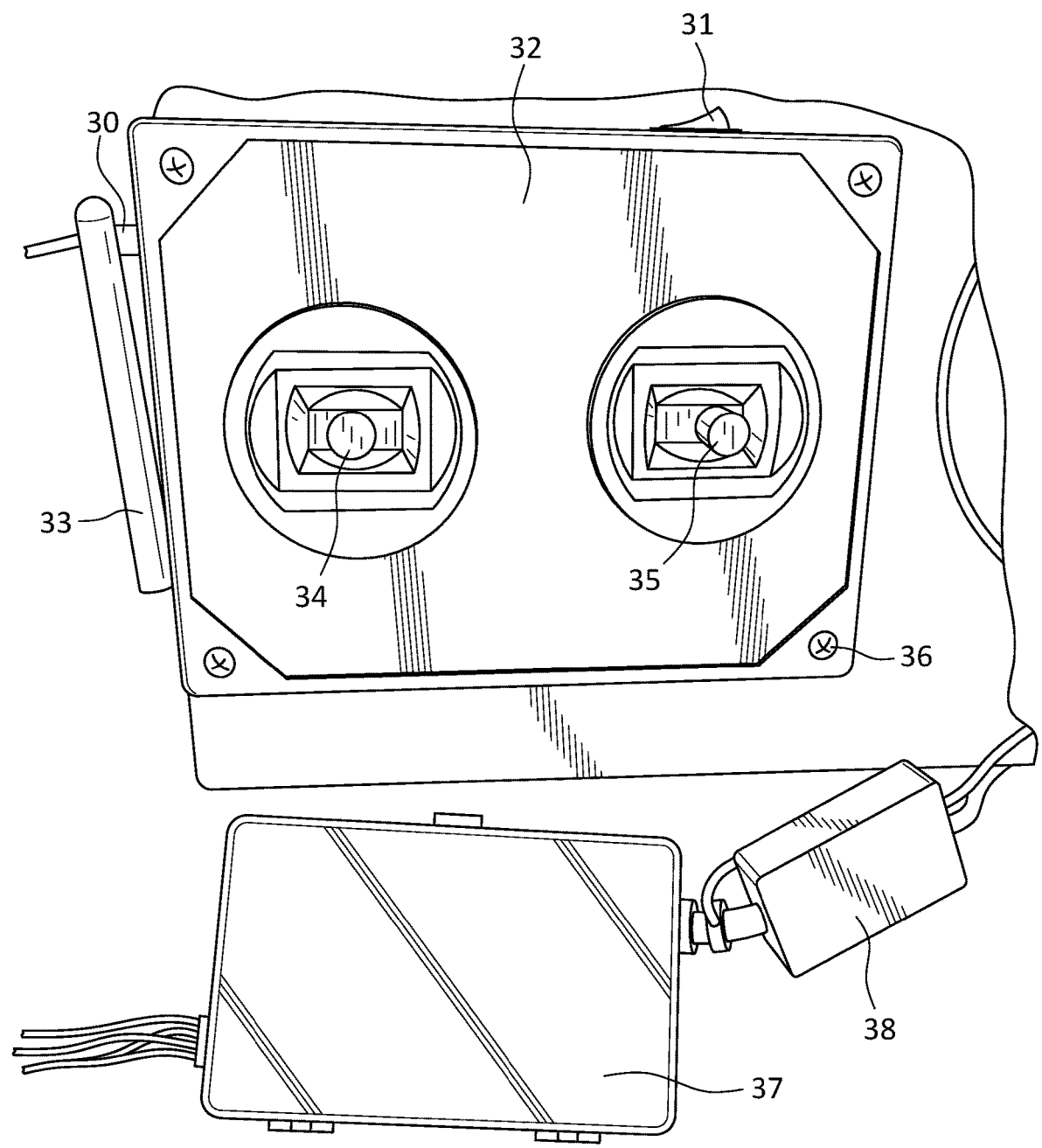
FIG. 8 Shows a top view of an example of the remote RF Transmitter with dual joysticks, and an example of a volt monitoring device according to various embodiments described herein.

A top view of the handheld wireless RF controller according to various embodiments of the present invention is illustrated in FIG. 8 and generally comprises a main watertight 36 enclosure 32, two joystick directional controls (Left 34 and Right 35), and a power on/off switch 31. The Wireless antenna is located on the outside of the enclosure; in other embodiments, the antenna can be made built in. There is also a power indicator light 30.

An example of an RF receiver FIG. 8 also watertight with electronic speed controls 37 is shown in and the transmitter 38 commonly found in the art.

Figure 9:
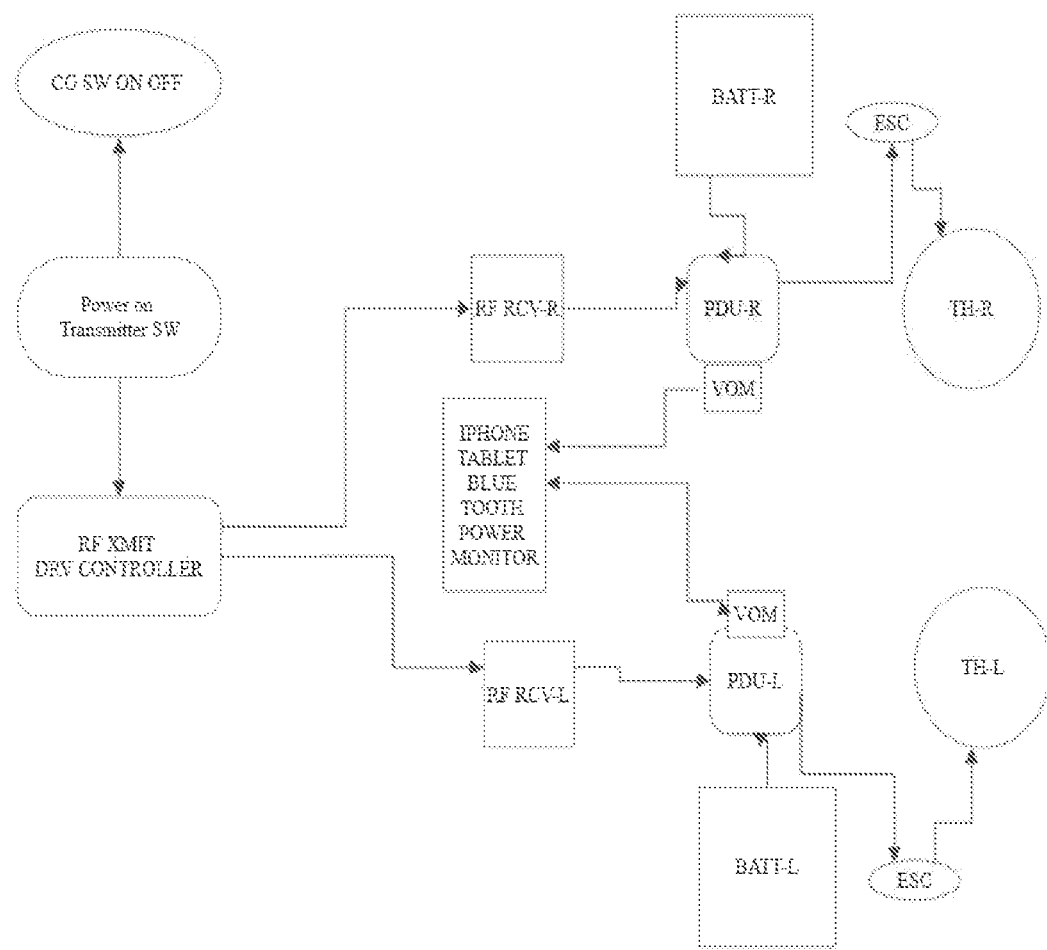
FIG. 9 Depicts a top view of the electrical drive controls systems flow chart according to various embodiments of the present invention.

A top view of the electrical flow chart is shown in FIG. 9 As power is applied in the transmitter control box 31 (FIG. 8), the receiver turns on as well in the Power Distribution unit 37 sending a circuit check to the thrusters where an audible tone is heard. Power up is complete.

As also depicted in (FIG. 9) there is a voltage monitor for the batteries and drive status via a transmitter located in each float within the power distribution units.

Each Float contains the individual power distribution unit (FIG. 9 and FIG. 7) 41, these send the signals to the Thrusters (FIG. 3 and FIG. 9) 9

Figure 10:
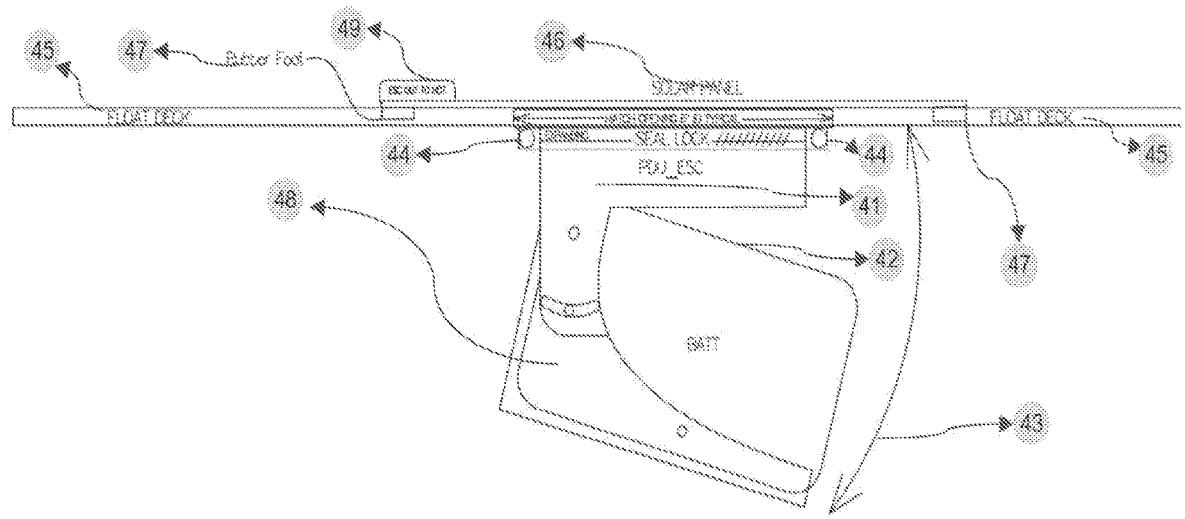
FIG. 10 Illustrates a side view of the Power Distribution unit, including battery, hatch seal. Also included in the view are details about battery mounting location and possible bracket angle pertaining to the float compartment.

Detailed side view of the float compartment Power Distribution unit (FIG. 10), showing the Power Distribution unit enclosure 41 which has attached to it the battery tray 48. This can be adjusted to the correct angle 43 for interference free installation. Also detailed in FIG. 10 is the solar panel 46 attached to the top of the seal lock 44, which in its current form acts as an attachment point for the Power Distribution unit 41 and Battery enclosure 48. The modular design can be made from ABS plastic, glass filled cloth, carbon fiber, aluminum, or any suitable light weight material. Also shown are the rubber feet 47 that are mounted to the bottom of the solar panel 46 to protect the surface of the float deck 45.

Detailed side view of the float compartment (FIG. 10) Also includes a depiction of the output watertight quick connector for the thruster 49. The battery angle 43 is depicted showing the variable mounting positions.

Figure 11:
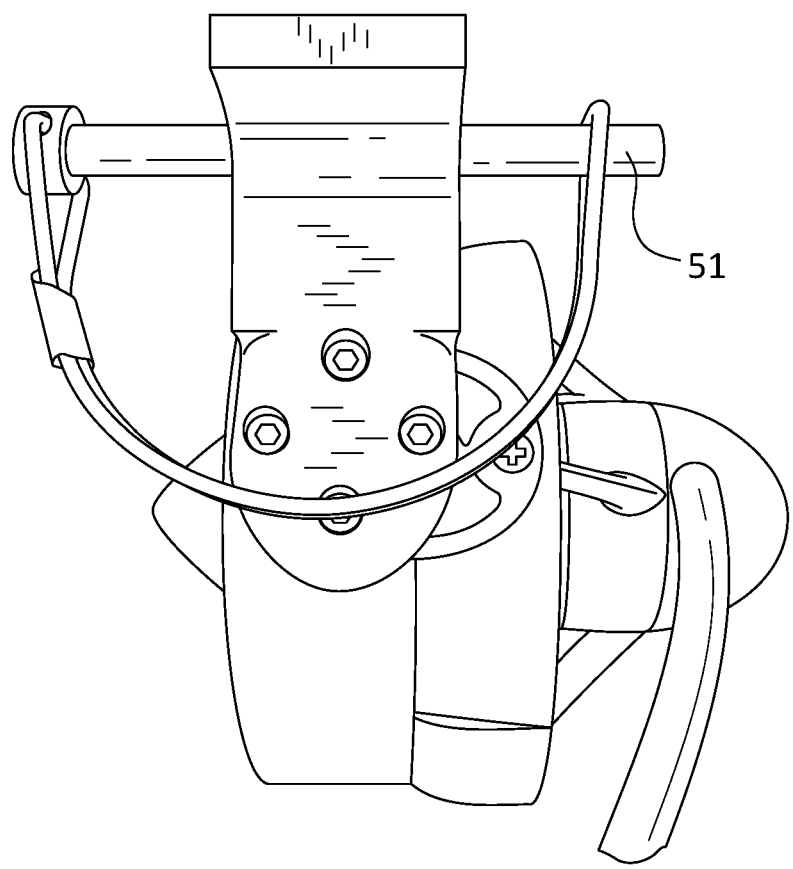
FIG. 11 Shows a top view of the actual thruster and B bracket with its locking pin.

Top View thruster FIG. 11 with B bracket attached and quick release pin 51 used to secure the B bracket to the A bracket be means of sliding the tab into the pocket of the A bracket. Once the pin holes align the Quick release pin passes through all three holes locking them all together.

Figure 12:
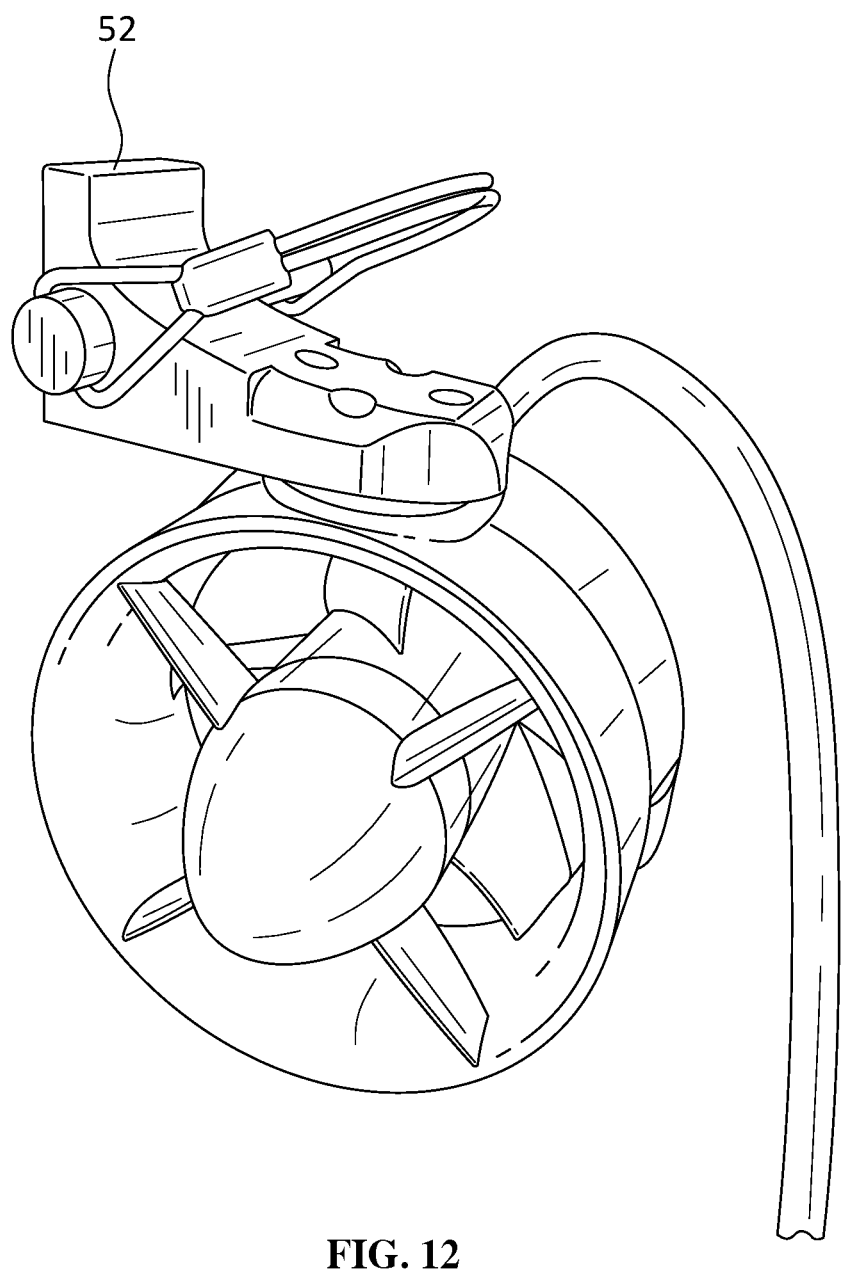
FIG. 12 Shows view of the thruster and B bracket with the Male element.

Front View thruster FIG. 12 with locking pin shows the B bracket mounted to the top of the thruster. This view clearly shows the locking tab 52 on the upper radius of the bracket which fits into the pocket of the A bracket 53. Together the two parts form a strong singular component and shown in FIG. 14

Figure 13:
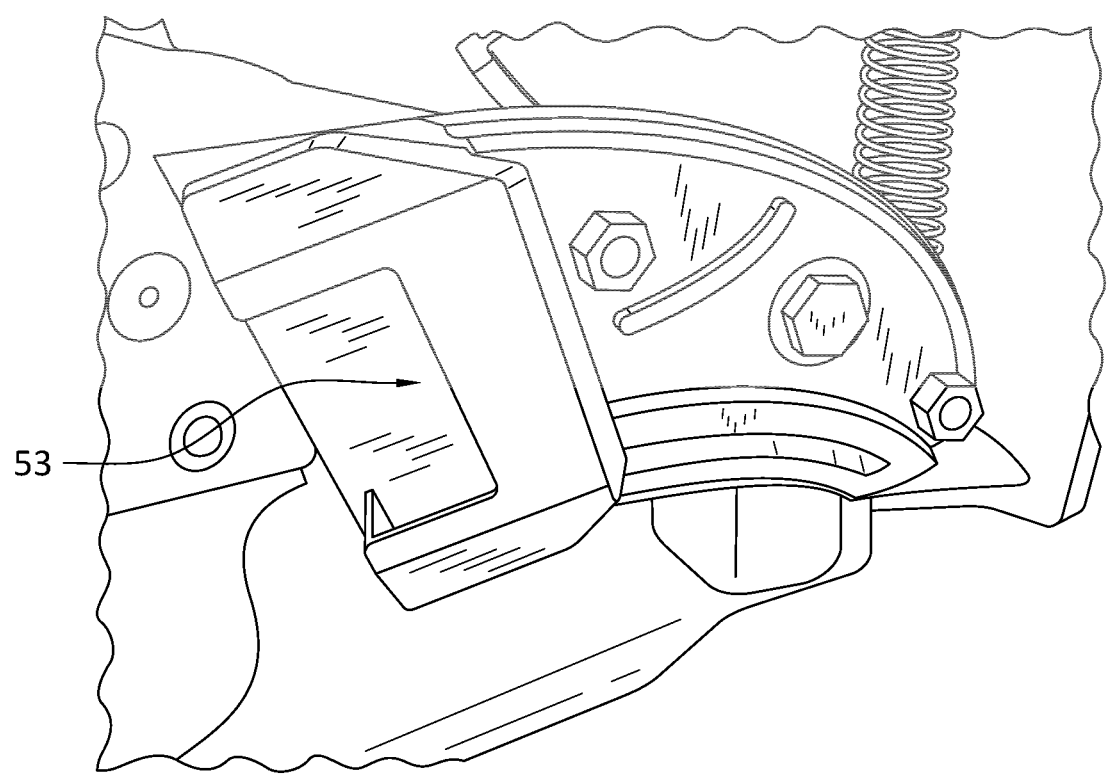
FIG. 13 Shows the A bracket with the Female element and lock pin holes.

Front View ALPB in up position. FIG. 13 shows the device what holds the rudder down thereby providing the necessary resistance to not lift out of the water while reverse thrust is applied. Some styles water rudders have pivots that are higher mounting locations requiring less hold down force.

The Current embodiment of the Power Distribution Unit allows for installation into many different float deck lid ring types 55. The Top View FIG. 15 shows the Power Distribution unit left side installed in float deck. Within the Power Distribution unit is the battery mounting bracket that is fixed to the bottom of the Power Distribution unit. Additionally, all power distribution is contained within to run the drive system and communicate with the controller by means of a smart receiver. The ability to remove the signal wire plug by the operator is accomplished by unplugging. Power to the Power Distribution unit is switched on and off by means of a dedicated low voltage watertight switch 56.

Rear View left side float with thruster installed. FIG. 15 is the current embodiment of one side complete functional system with power 57, wireless communication, telemetry, thrusters, both A and B brackets locked together 58 with quick release pin and in the up position over the ALPB bushing as seen also FIG. 5 location 25.

A bracket FIG. 16 showing pocket 59 for securing the tab on the B bracket FIG. 12 comprises the mount for the thruster 52.

The current embodiment of the controller unit FIG. 17 shows the dual sliders for directional control 60 and built in telemetry display for system monitoring 61.

8. OPERATION

To use the drive the operator will need to first mount the components to the float compartments with consideration to left or right as they are directionally specified FIG. 15. The Thruster drive brackets will need to be installed to the rear of the floats FIG. 13 at the abovementioned mounting locations for the rudders.

Once installed, on the float plane and the system tested, weight and balance performed by appropriate personnel, the system can be test flown and verified for service. Before operating the aircraft on water the power to each Power Distribution Unit detailed above should be switched to the on position FIG. 15 56

Once on water and clear of obstructions the water rudders FIG. 4 deployed to the down position described in the supplement provided by the manufacture of the float, and the power on switch to the Control unit FIG. 17 62 can be turned on. The status of the system will display in the window of the controller FIG. 17 61

The pilot can operate the drive system from the cockpit which provides forward thrust by moving the individual sliders up for the forward direction and down for the reverse direction. Center is the off position, and the thrusters stop turning. By powering off the control unit 62 the system safely disengages and remains off until both power the unit is turned back on and the sliders are returned to the off position, then the system will re initialize.

Turning the vessel is accomplished by either both sliders up (fwd.) and the left or right rudder pedals moved in the desired direction or by keeping them straight and applying opposite controls.

Braking is applied by moving the thruster control sliders to the down position to observe no more forward movement. Reverse is accomplished in the same direction and the braking action for that is accomplished by moving the sliders forward momentarily until the reverse motion is arrested.

It is intended that the system be used even while the aircraft engine is on and in a slow movement configuration to assist in directional control. The aircraft will operate normally with the thrusters down and off as water is able to pass through the nacelle of the thruster which need only be raised for takeoff or landing.

Power off the control unit 62 the system safely disengages, the thrusters and then can be raised without running them dry as they are water lubricated.

The above description shall not be construed as limiting in ways which this many other variation by those skilled in the area who's changes, or modification could be made without departing from the broad interest, intent, and true spirit of this invention.

9. SUMMARY AND SCOPE

After reading the forestated description SEAPLANE ELECTRIC THRUSTER DRIVE SYSTEM FOR LOW-SPEED MANEUVERING 52, male element of the B bracket and 53, the female element become one contiguous component and allow the force of the thruster to deflect off the rudder to provide a substantial amount of force to propel the vessel. An operator is able to use the directional control to move the thrusters to the left, right, or keep in the center along with variable thrust to achieve a superior directional control in most situations, thusly avoiding collisions with persons or objects which is the intent of the invention. The Above method for mounting and controlling the devices obtains the maximum amount of control with the least amount of weight.

At end: The above description shall not be construed as limiting in ways which this many other variation by those skilled in the art who's changes, or modification could be made without departing from the broad interest, intent, and true spirit of this invention.

The invention claimed is:

1. A drive system for low-speed maneuvering of a seaplane, comprising:
   a mounting bracket connectable to a rudder of the seaplane;
   a thruster connected to the mounting bracket, wherein the mounting bracket and the thruster are configured to move with the rudder between an upper position of the rudder for flight and a lower position of the rudder for water maneuvering;
   a power distribution unit connectable to a battery for providing power to the thruster; and
   a controller configured to control a rotation direction and rotation speed of the thruster.

2. The drive system of claim 1, further comprising a releasable connection for connecting the mounting bracket and the thruster.

3. The drive system of claim 2, wherein the releasable connection includes a first part connected to the bracket and a second part connected to the thruster, wherein the first part and the second part are connected by sliding relative to each other.

4. The drive system of claim 3, further comprising a locking pin for locking the first part to the second part.

5. The drive system of claim 1, wherein the mounting bracket is connectable to an inboard surface of the rudder and is pivotable with the rudder.

6. The drive system of claim 1, wherein the power distribution unit is insertable into a conventional deck lid.

7. The drive system of claim 6, wherein the power distribution unit includes a battery holder.

8. The drive system of claim 1, wherein the controller includes a telemetry display for system monitoring and reports battery voltage of the battery.

9. A seaplane having a drive system for low speed maneuvering, comprising:
   a first float;
   a first rudder disposed respectively on a rear end of the first float, the first rudder being pivotable between an upper position for flight and a lower position for water maneuvering;
   a first thruster connected to the first rudder, wherein the first thruster moves with the first rudder between the upper position for flight and the lower position for water maneuvering;
   a first power distribution unit connectable to a first battery for providing power to the first thruster; and
   a controller configured to control a rotation direction and rotation speed of the first thruster.

10. The seaplane of claim 9, further comprising a mounting bracket connected to the first rudder, the first thruster being connected to the bracket, and a pivoting axis of the first rudder passing through the mounting bracket.

11. The seaplane of claim 10, further comprising a releasable connection for connecting the mounting bracket and the first thruster.

12. The seaplane of claim 11, wherein the releasable connection includes a first part connected to the bracket and a second part connected to the thruster, wherein the first part and the second part are connected by sliding relative to each other.

13. The seaplane of claim 12, further comprising a locking pin for locking the first part to the second part, the locking pin being releasable in the upper position and the lower position of the first rudder.

14. The seaplane of claim 9, comprising the first float, wherein the first power distribution unit is insertable into a conventional deck lid in the first float.

15. The seaplane of claim 14, wherein the first power distribution unit includes a battery holder.

16. The seaplane of claim 9, further comprising a second float and a second rudder disposed on a rear end of the second float.

17. The seaplane of claim 16, further comprising a second thruster connected to the second rudder, and a second power distribution unit connectable to a second battery for providing power to the first thruster, the controller including separate controls for each of the first thruster and the second thruster.

18. The seaplane of claim 17, wherein the controller includes a telemetry display for system monitoring and reports battery voltage of the first battery and the second battery.

19. The seaplane of claim 17, wherein the first power distribution unit and the second power distribution unit are respectively installed in the first float and the second float.

* * * * *